United States Patent [19]
Koch et al.

[11] Patent Number: 5,581,996
[45] Date of Patent: Dec. 10, 1996

[54] METHOD AND APPARATUS FOR TURBINE COOLING

[75] Inventors: Carl C. Koch; Onofre T. Castells, both of Cincinnati, Ohio

[73] Assignee: General Electric Company, Cincinnati, Ohio

[21] Appl. No.: 515,847

[22] Filed: Aug. 16, 1995

[51] Int. Cl.$^6$ .................................................. F02C 7/12
[52] U.S. Cl. ........................ 60/39.02; 60/39.07; 60/266; 60/726
[58] Field of Search ............................... 60/39.02, 39.07, 60/39.83, 39.75, 266, 726, 751; 415/77; 416/193 R

[56] References Cited

U.S. PATENT DOCUMENTS

| | | | |
|---|---|---|---|
| 3,440,818 | 4/1969 | Quillevere et al. | 60/726 |
| 3,973,396 | 8/1976 | Kronogard | 60/39.66 |
| 4,187,675 | 2/1980 | Wakeman | 60/39.75 |
| 4,254,618 | 3/1981 | Elovic | 60/226 R |
| 4,645,415 | 2/1987 | Hovan et al. | 415/115 |
| 4,791,784 | 12/1988 | Minardi et al. | 60/39.19 |
| 4,901,520 | 2/1990 | Kozak et al. | 60/39.02 |
| 5,144,794 | 9/1992 | Kirkami et al. | 60/39.75 |
| 5,163,285 | 11/1992 | Mazeaud et al. | 60/39.07 |
| 5,211,003 | 5/1993 | Samuel | 60/39.07 |
| 5,255,505 | 10/1993 | Cloyd et al. | 60/39.07 |
| 5,297,386 | 3/1994 | Kervistio | 60/226.1 |
| 5,392,614 | 2/1995 | Coffinberry | 62/402 |

*Primary Examiner*—Louis J. Casaregola
*Attorney, Agent, or Firm*—Andrew C. Hess; Wayne O. Traynham

[57] ABSTRACT

A method and apparatus provide cooling air from a compressor to hot components in a gas turbine engine. Compressed air discharged from an exit of the compressor is stratified into a main flow channeled to a combustor, and a separate bleed flow channeled to a heat exchanger. The bleed flow has an above average pressure whereas the main flow has a below average pressure. The bleed flow is cooled in the heat exchanger and channeled to hot components of the engine for cooling thereof.

10 Claims, 4 Drawing Sheets

METHOD AND APPARATUS FOR TURBINE COOLING

BACKGROUND OF THE INVENTION

The present invention relates generally to gas turbine engines, and, more specifically, to cooling hot components therein.

Advancements in aircraft gas turbine engines have improved both fuel efficiency and core specific power. These advances have occurred in large part by the improved thermodynamic cycle achieved by simultaneous increases in the overall pressure ratio and in the turbine inlet temperatures. A major step forward was achieved by the introduction of air cooling for the critical hot components such as the combustor, and turbine blades, nozzles, shafts, and disks. The rate of further advances has been paced by both the technology for improving air cooling and the availability of high temperature materials for the critical components. These advances slowed as the physical limits of metallic materials were approached.

The current method of air cooling utilizes a portion of the compressor exit air as the cooling source specifically bled and channeled for cooling the hot components. Such bleed air is parasitic since it is not used in the combustion process for generating power. As the pressure ratio is ever increased in turbine designs, the cooling air temperature correspondingly increases and therefore the quantity of such air must be increased. Similarly, increases in turbine inlet temperature also result in corresponding need to increase the cooling air. These increases of parasitic cooling air eventually limit the cycle gains and no further improvements are possible unless new methods are utilized. Methods which attempt to cool the cooling air discharged from the compressor have been limited by the attendant pressure losses encountered in the cooling process. In some conventional designs, a separate compressor is provided to repressurize the cooling air, with a resultant increase in complexity of the engine and power loss thereby.

SUMMARY OF THE INVENTION

A method and apparatus provide cooling air from a compressor to hot components in a gas turbine engine. Compressed air discharged from an exit of the compressor is stratified into a main flow channeled to a combustor, and a separate bleed flow channeled to a heat exchanger. The bleed flow has an above average pressure whereas the main flow has a below average pressure. The bleed flow is cooled in the heat exchanger and channeled to hot components of the engine for cooling thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
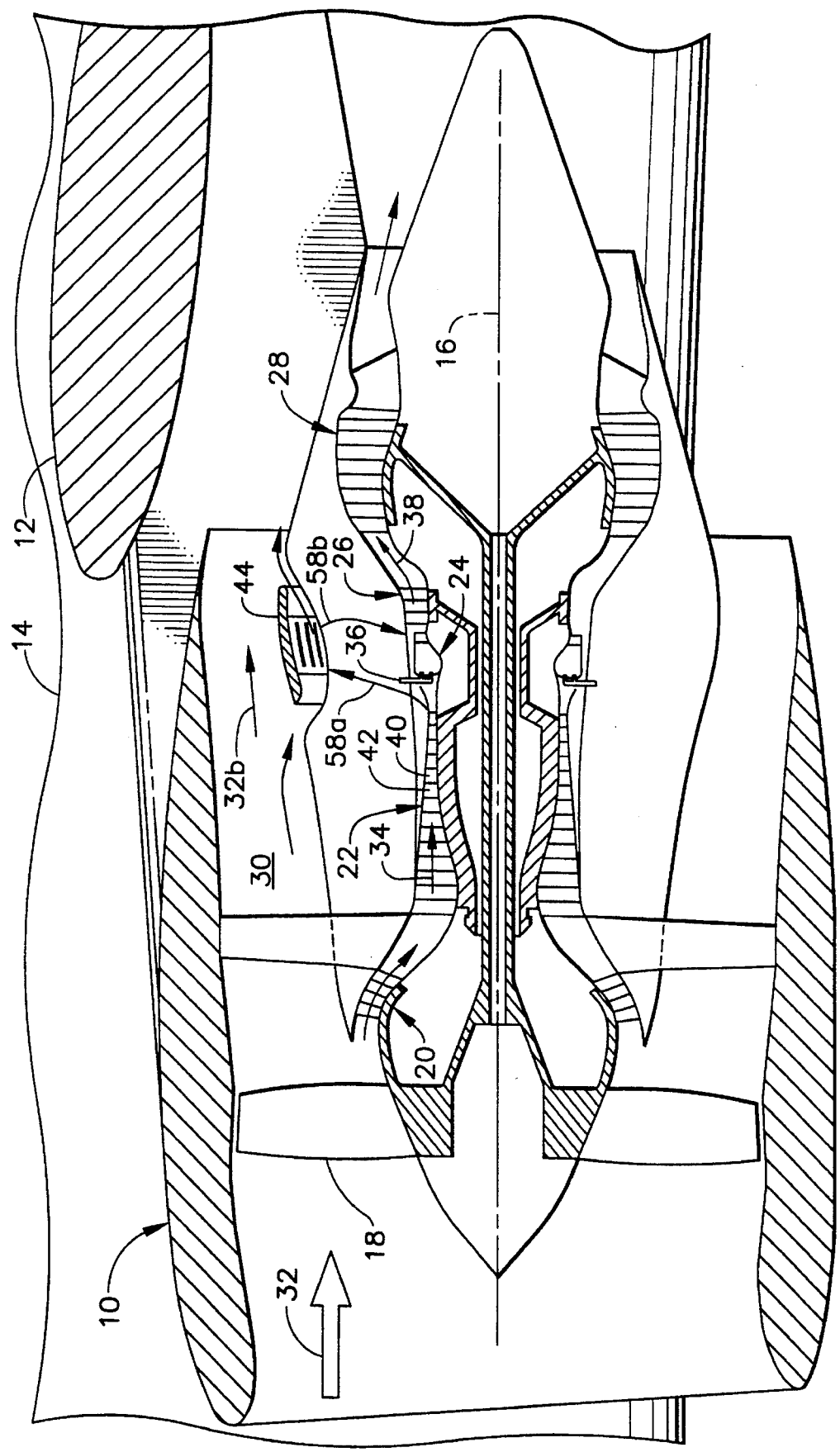
FIG. 1 is a partly sectional schematic representation of an aircraft turbofan gas turbine engine having a cooling arrangement in accordance with one embodiment of the present invention.

Illustrated schematically in FIG. 1 is an exemplary aircraft turbofan gas turbine engine 10 mounted to a wing 12 of an aircraft 14, only a portion of which is illustrated. The engine 10 includes in serial flow relationship about an axial centerline axis 16 a fan 18; low pressure or booster compressor 20; high pressure compressor 22; combustor 24; high pressure turbine 26; and low pressure turbine 28. The high pressure turbine 26 is joined to the high pressure compressor 22 by a suitable shaft for rotating and powering the high pressure compressor 22. The low pressure turbine 28 is correspondingly joined to the fan 18 and the booster compressor 20 by a suitable shaft for rotating and powering these components. Disposed downstream of the fan 18 is an annular fan bypass duct 30 which surrounds the booster compressor 20, high pressure compressor 22, combustor 24, high pressure turbine 26, and a portion of the low pressure turbine 28 in a conventional manner.

During operation, ambient air 32 passes through the fan 18 and an inner portion of which is channeled in turn through the booster compressor 20 and the high pressure compressor 22 which provides compressed air 34 to the combustor 24 wherein it is mixed with fuel from conventional fuel injectors 36 and ignited for generating hot combustion gases 38 which flow downstream through the turbines 26 and 28 which extract energy therefrom for powering the engine. An outer portion of the intake air 32 is channeled through the bypass duct 30 as bypass air 32b which is discharged from the engine for generating thrust to power the aircraft 14 in flight.

Figure 2:
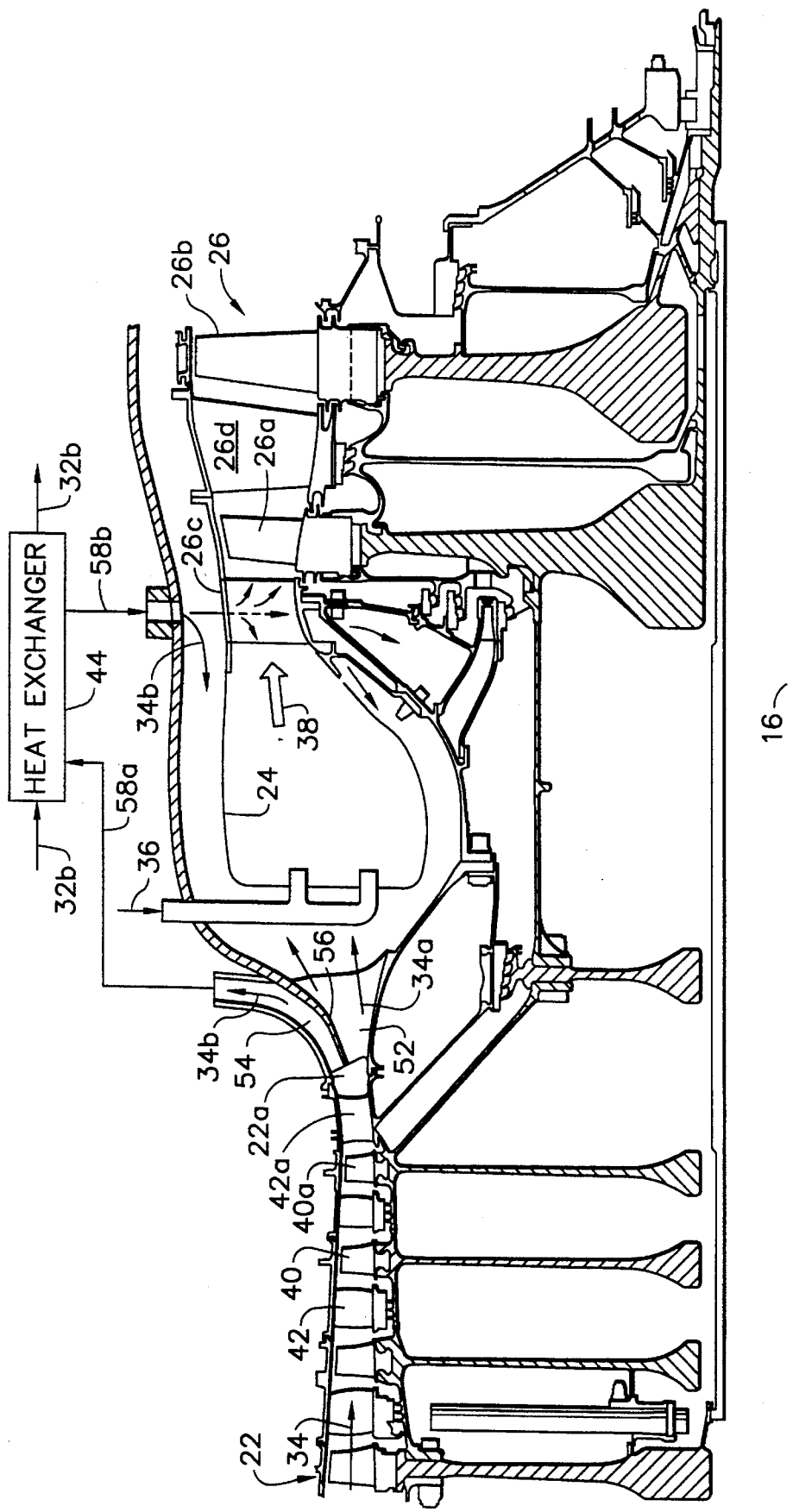
FIG. 2 is a partly sectional schematic representation of the compressor, combustor, and turbine portions of the engine illustrated in FIG. 1 including the first embodiment of the cooling apparatus of the present invention.

In accordance with the present invention, cooled-cooling air may be provided to the hot components such as the combustor 24 and the various components of the high pressure turbine 26 for the cooling thereof in an improved manner for allowing further advances in increase of pressure ratio and/or turbine inlet temperature with all of the attendant advantages therefrom which are well known in the art. As illustrated in FIGS. 1 and 2, the compressor 22 is an axial compressor having a plurality of stages or rows of rotor blades 40 and stator vanes 42 for compressing air. As shown in the exemplary embodiment illustrated in FIG. 2, the compressor 22 has an annular exit 22a, and disposed immediately upstream therefrom is a last stage row of stator vanes configured as outlet guide vanes 42a. And disposed immediately upstream therefrom is a last stage of rotor blades 40a. In accordance with the present invention, at least the last stage of rotor blades 40a is configured for stratifying at the compressor exit 22a the pressure profile of the compressed air 34 to provide a main flow 34a having a below average total pressure, and a separate bleed flow 34b having an above average total pressure. In this way, the high pressure compressor 22 itself may be used to increase the relative pressure of the bleed flow 34b relative to the main flow 34a prior to undergoing cooling in a conventional heat exchanger 44. This increased pressure of the bleed flow 34b then accommodates the attendant pressure losses through the heat exchanger 44 and corresponding conduits channeling the bleed air 34b back to the hot components of the engine for the cooling thereof.

Figure 3:
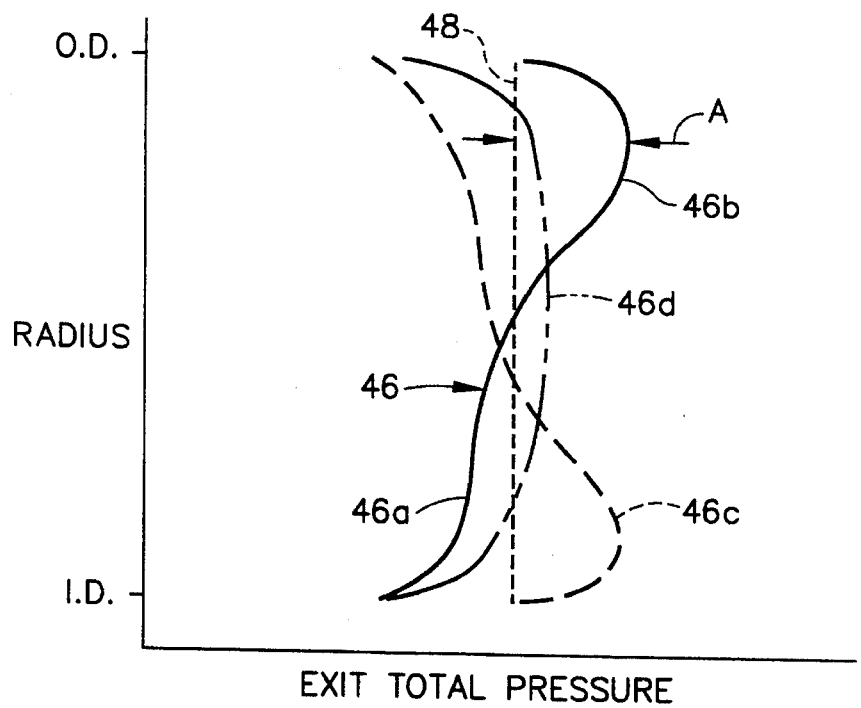
FIG. 3 is a graph plotting exit total pressure of the compressor illustrated in FIG. 2 versus radius showing a profile having above and below average portions in accordance with exemplary embodiments of the present invention.

FIG. 3 is an exemplary graph plotting total pressure at the compressor exit 22a versus the radius from the inner diameter (I.D.) to the outer diameter (O.D.) of the annular flow path defined at the compressor exit 22a. Shown in solid line is an exemplary pressure profile 46 in accordance with one embodiment of the invention showing pressure stratification relative to the average pressure indicated by the straight dashed line 48. In this exemplary embodiment, the pressure is stratified so that the below average pressure of the main flow 34a, as represented by the lower portion 46a, is disposed radially below the above average pressure of the bleed flow 34b, as represented by the upper portion designated 46b. In this way, the above average pressure corresponds with the tip regions of the blades 40, with the below average pressure corresponding with portions therebelow down to the root portions thereof. In an alternate embodiment as disclosed below, the pressure profile 46 may be radially reversed as illustrated in part in phantom line 46c if desired.

Figure 4:
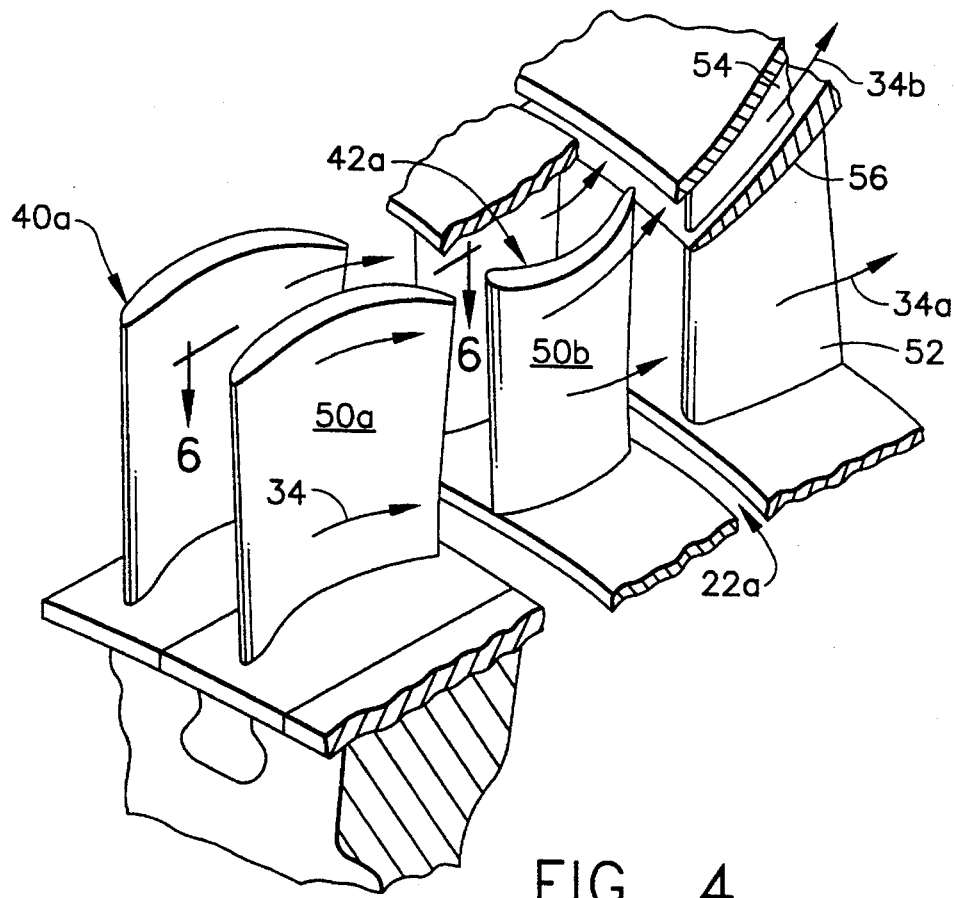
FIG. 4 is a perspective view of a portion of the exit end of the compressor illustrated in FIG. 2 having last stage rotor blades, outlet guide vanes, and a radially split diffuser.

FIG. 4 illustrates in more particularity the last stage of rotor blades 40a and the outlet guide vanes 42a disposed downstream therefrom. Each of the blades 40a and vanes 42a has a corresponding airfoil 50a and 50b, respectively, which have leading and trailing edges, convex pressure sides, and concave suction sides. The blade airfoil 50a is conventionally joined to a rotor disk through an integral dovetail and extends from a radially inner root to a radially outer tip. The vane airfoil 50b typically extends from its inner diameter from one annular supporting band to its outer diameter to another annular supporting band in a conventional arrangement. The airfoils 50a and 50b are conventionally configured for pressurizing and turning the compressed air 34 for discharge from the compressor exit 22a. However, in accordance with the present invention, the configurations of the airfoils 50a and 50b are suitably altered for effecting the modified pressure profile 46 illustrated in FIG. 3. In a conventional engine, the exit total pressure profile is substantially uniform from the I.D. to the O.D., with the profiles of the airfoils 50a, 50b being suitably configured therefor. By suitably modifying the configuration of the airfoils 50a and 50b, the above average portion may be effected adjacent to one of the airfoil roots (I.D.) or tips (O.D.) as desired, and in the exemplary embodiment illustrated in FIGS. 3 and 4, the above average pressure profile 46b is effected adjacent to the blade airfoil tips, with the below average pressure profile 46a being effected radially therebelow down to the roots.

Since the blade airfoils 50a illustrated in FIG. 4 impart energy into the compressed air 34 for increasing its pressure, the blade airfoils 50a primarily control the pressure profile 46 at the compressor exit 22a. The vane airfoils 50b are correspondingly configured to properly turn the airflow in accordance with the conventional practice and for maintaining the pressure profile 46 being effected by the blade airfoil 50a. In one embodiment, only the airfoils 50a of the last stage of the high pressure compressor 22 need be suitably modified for effecting the desired pressure profile 46. The remaining upstream stages may have conventional airfoil configurations with resultant substantially uniform pressure profiles being effected therefrom. In alternate embodiments, additional stages of the blades 40 and vanes 42 upstream from the last stage blades 40a may also be configured for effecting and gradually building the resultant pressure profile 46 at the compressor exit 22a if desired. Since a typical modern axial high pressure compressor 22 has a substantial number of stages therein, it is not desirable nor required that all of the stages therein be modified in accordance with the present invention to effect the desired pressure profile 46 at the compressor exit 22a. The number of stages modified in accordance with the present invention will depend on individual designs for effecting the desired magnitude of the above and below average pressures in the pressure profile 46 within suitable desired limits.

For example, in a preferred embodiment of the present invention, the bleed flow 34b portion of the compressed air 34 is preselected to cover a radial extent of about 10% to about 15% of the compressor exit 22a, with the main flow 34a portion of the compressed air 34 occupying the remaining 85% to 90% of the radial extent thereof below the bleed flow 34b. And, the maximum magnitude of the above average pressure in the profile portion 46b has a magnitude A up to about 6% above the average pressure (profile 48), with the below average pressure having a magnitude correspondingly lower than the average pressure. The below average pressure profile portion 46a remains so for the radial extent of the compressor exit 22a until it reaches the above average pressure profile portion 46b having a transition to the outer diameter of the exit 22a. In this way, the bleed flow 34b may have a substantial increase in pressure over the average at the expense of a relatively slight decrease in pressure of the main flow 34a since the flow volume of the bleed flow 34b is substantially less than the flow volume of the main flow 34a. If desired, the compressor 22 could be reconfigured over a baseline design, as shown by the phantom line 46d, so that the below average pressure is the same as the baseline average value, and is therefore not reduced for a given sized engine.

As shown in FIG. 2, the combustor 24 is disposed in flow communication with the compressor 22 for receiving the main flow 34a therefrom for mixing with the fuel and being conventionally ignited to generate the hot combustion gases 38. The high pressure turbine 26 is disposed in flow communication with the combustor 24 in a conventional exemplary two stage arrangement for receiving the combustion gases 38 therefrom and powering the high pressure compressor 22.

A conventionally configured main diffuser 52 as shown in FIGS. 2 and 4 is disposed in direct flow communication with the compressor exit 22a for receiving solely the main flow 34a therefrom and diffusing that flow prior to being channeled into the combustor 24 for combustion. A conventionally configured bleed diffuser 54 is disposed in this exemplary embodiment radially above the main diffuser 52 and also in direct flow communication with the compressor exit 22a for receiving solely the bleed flow 34b therefrom. A suitable annular splitter 56 separates the main diffuser 52 from the bleed diffuser 54 to provide separate flow paths suitably aligned with the stratified compressed air 34 discharged from the compressor exit 22a with the above average pressure bleed flow 34b being disposed radially above the below average pressure main flow 34a. The splitter 56 in the exemplary embodiment illustrated in FIG. 4 is located at a radial extent between the inner diameter and the outer diameter of the compressor exit 22a at about the 85% to 90% radial extent to correspond with the transition in the pressure profile 46 between the below and above average portions 46a and 46b thereof.

In this way, the high pressure compressor 22 may utilize one or more of its own stages to initially compress a portion of the compressed air 34 to a greater pressure than would otherwise occur in a conventional compressor for increasing the pressure of the bleed flow 34b prior to being channeled to the heat exchanger 44. As shown in FIG. 2, the heat exchanger 44 is suitably disposed in flow communication with the compressor 22 for receiving and cooling the bleed flow 34b received therefrom. A suitable inlet line or conduit 58a joins the exit of the bleed diffuser 54 to the heat exchanger 44 in a first cooling circuit therethrough which cools the bleed flow 34b and returns it to the hot components of the engine through a return line or conduit 58b. In the exemplary embodiment illustrated in FIG. 2, the return line 58b is disposed in flow communication with at least the high pressure turbine 26 to provide cooled bleed flow thereto for cooling thereof. In this exemplary embodiment, the turbine 26 includes two rotor stages 26a and 26b and corresponding turbine nozzles 26c and 26d. The rotors and nozzles 26a–d are conventional, with the cooled bleed flow 34b being suitably channeled to these components in a conventional manner for channeling the cooled bleed flow therethrough. As shown in FIG. 2, the cooled bleed flow may be channeled radially inwardly through the first stage nozzle 26c, for example, and radially inside the engine for flow radially upwardly through the first stage rotor 26a for conventionally cooling the rotor blades thereof. A portion of the cooled bleed flow may also flow in the annulus surrounding the combustor 24 for providing improved cooling thereof if desired.

The heat exchanger 44 illustrated in FIG. 2 may take any suitable form including an air-to-air heat exchanger as shown, or a fluid-to-air heat exchanger using relatively cool fuel as the heat sink. The heat exchanger 44 has a primary circuit disposed in series with the inlet and return lines 58a and 58b which carries the bleed flow 34b for cooling therein. The heat exchanger 44 also has a secondary circuit through which is suitably channeled a portion of the bypass air 32b which is used as the heat sink for cooling the bleed flow 34b. FIG. 1 illustrates an exemplary configuration of the heat exchanger 44 which is disposed in the fan bypass duct 30 for receiving a portion of the bypass air 32b to cool the bleed flow 34b. Any suitable arrangement and type of heat exchanger 44 may be utilized.

Although cooling compressor bleed flow in heat exchangers for subsequently cooling hot turbine components is known in the art, pressure losses are associated therewith which inherently limit the efficiency thereof. It is also known to use separate additional compressors for increasing the pressure of the bleed flow to accommodate for the pressure losses. These prior art devices are relatively complex and limit the overall efficiency gains possible. In contrast, by utilizing a portion of the high pressure compressor 22 itself suitably configured in accordance with the present invention, the compressor 22 can firstly increase the pressure of the bleed flow 34b at the expense of a reduction in pressure of the main flow 34a for accommodating the attendant pressure losses occurring through the heat exchanger 34 and conduits which return the cooled bleed flow to the hot components. However, the overall simplicity of the present invention allows for improved performance without additional auxiliary compressors.

Figure 5:
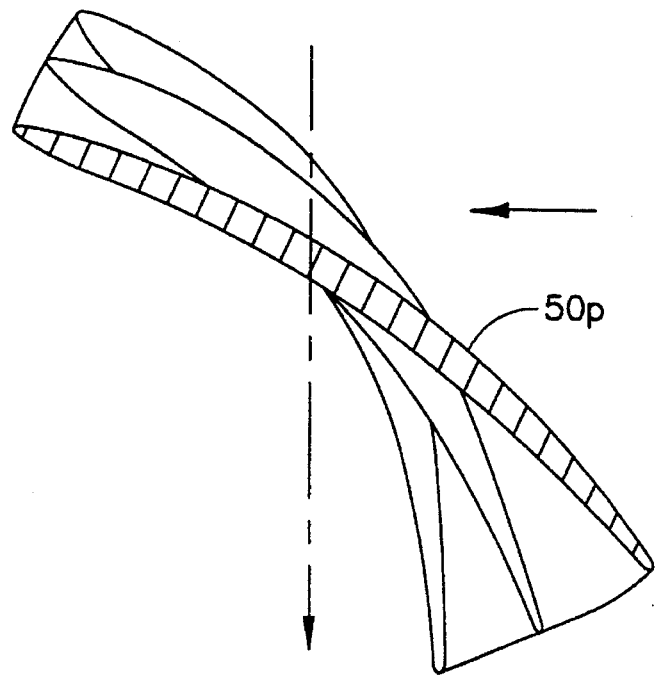
FIG. 5 is a top view of an exemplary prior art airfoil of a compressor rotor blade.
Figure 6:
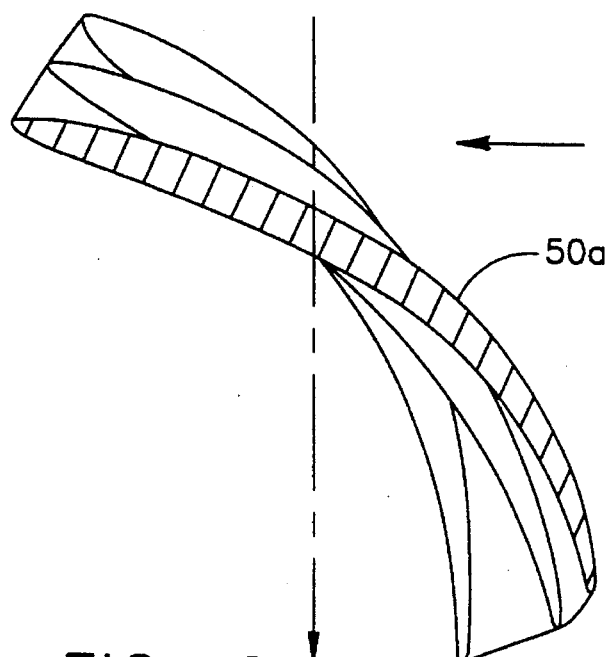
FIG. 6 is a top view of the last stage compressor rotor blade illustrated in FIG. 4 and taken along line 6—6 for showing exemplary camber relative to the camber of the airfoil illustrated in FIG. 5.

FIG. 5 illustrates an exemplary configuration of a prior art airfoil 50p of a typical last stage compressor rotor blade. The airfoil is conventionally configured in camber or curvature, which typically includes maximum camber near the root of the airfoil with decreasing camber up until the tip thereof. FIG. 6 illustrates an exemplary embodiment of a correspondingly modified airfoil 50a of the last stage compressor blades 40a which shows exemplary changes in curvature or camber for effecting the desired pressure profile 46 illustrated in FIG. 3. Although the camber of the airfoil conventionally decreases from the root to the mid-span or pitch thereof and partially toward the tip, the tip portion of the airfoil 50a has a greater curvature or camber than it otherwise would when viewed in comparison with FIG. 5. In the exemplary embodiment illustrated in FIG. 6, the camber of the mid-span section of the airfoil 50a is less than the camber of the airfoil tip and root sections. In the prior art airfoil 50p illustrated in FIG. 5, the camber of the airfoil tip is less than the camber of the airfoil mid-span section which in turn is less than the camber of the airfoil root.

FIG. 6 is merely a general representation illustrating that different aerodynamic profiles as represented by the curvature or camber of the airfoil 50a may be used to effect the main and bleed flows 34a and 34b in accordance with conventional design practices for generating airfoil contours. By differently configuring the aerodynamic profiles of the airfoil 50a from root-to-tip, or from I.D.-to-O.D., the compressed air 34 may be suitably stratified in accordance with the present invention to provide the above average pressure bleed flow 34b relative to the below average pressure main flow 34a.

As indicated above, the airfoils 50a as represented in FIGS. 4 and 6 are configured to effect the above average pressure near the radially outer tips of the airfoils 50a, and the below average pressure therebelow to the roots thereof. If desired, the airfoils 50a may be otherwise configured to reverse the radial orientation of the pressure profile 46 as illustrated in FIG. 3 in part by the phantom line designated 46c to provide the above average pressure bleed flow near the I.D. of the airfoil, with the below average pressure portion occurring radially thereabove to the O.D. of the airfoil. In such an embodiment, the bleed flow would be suitably channeled radially inwardly in the engine radially below the combustor 24 illustrated in FIG. 2 with a suitable heat exchanger being provided for cooling the bleed flow radially inside the engine instead of radially above the combustor 24.

Since the bleed flow 34b is firstly increased in pressure above average prior to undergoing cooling in the heat exchanger 44 it provides relatively high pressure, cool bleed flow for cooling the hot components of the engine. If desired, a conventional turbocooler may be used downstream from the heat exchanger 44 for further increasing its pressure if desired. Since the bleed flow 34b is at an elevated pressure above the pressure of the main flow 34a, it may be suitably used for both convection and film cooling of various critical hot components in a conventional manner. The cooled bleed flow 34b may be suitably channeled into conventional cooling conduits for cooling any hot component such as the combustor 24 or the various parts of the high pressure turbine 26 as desired.

Another important advantage of the present invention is the ability to reduce film cooling air used for cooling the high pressure nozzle 26c and the liner of the combustor 24. These components require effective cooling for long useful lives and are typically cooled with a substantial amount of film cooling air. However, film cooling air dilutes the combustion gases entering the turbine rotors 26a,b and reduces power. Accordingly, the combustion flame temperature is typically increased in the prior art to accommodate for the film cooling air dilution. Since the present invention provides substantially cooler and higher pressure cooling air, less film cooling air is required for cooling the nozzle 26c and the combustor liner, with more convection cooling being used instead. The utilization of convection cooling for the nozzle 26c and the combustor liner along with the reduction of film cooling will result in a significant reduction of the dilution of the main flow. This results in a lowering of the combustion flame temperature for the same turbine rotor inlet temperature, with a large reduction in the production of air pollution compounds such as NOx.

The incorporation of the present invention into an aircraft gas turbine engine may be used to increase overall pressure ratio of the engine, or increase the turbine inlet temperature, or any combination thereof. Fuel efficiency may therefore be enhanced, and an increased output from a core engine of a given size may be obtained by increasing the core booster flow and pressure, and in new engines by allowing better cycle conditions. The present invention is relatively simple in construction and attendant cost of manufacture.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A method for providing cooling air to hot components in a gas turbine engine having a compressor and combustor, comprising the steps of:

stratifying an exit pressure profile of compressed air discharged from said compressor to provide a main flow to said combustor having a below average pressure and a separate bleed flow having an above average pressure;

cooling said bleed flow; and channeling said cooled bleed flow to said hot components for cooling thereof.

2. A method according to claim 1 wherein said compressor includes airfoils, and said stratifying step is effected by differently configuring aerodynamic profiles thereof from inner diameter to outer diameter.

3. A method according to claim 2 wherein said airfoils are rotor blade airfoils.

4. A method according to claim 3 wherein said airfoils are configured to effect said above average pressure near tips thereof and said below average pressure therebelow to roots thereof.

5. A gas turbine engine comprising:

a compressor having a plurality of stages of rotor blades and stator vanes for compressing air, at least a last stage of said rotor blades having airfoils configured for stratifying at an exit of said compressor a pressure profile of said compressed air to provide a main flow having a below average pressure and a separate bleed flow having an above average pressure;

a combustor disposed in flow communication with said compressor for receiving said main flow for mixing with fuel to generate hot combustion gases;

a turbine disposed in flow communication with said combustor for receiving said combustion gases therefrom, and operatively joined to said compressor for powering said compressor; and a heat exchanger disposed in flow communication with said compressor for receiving and cooling said bleed flow, and disposed in flow communication with at least said turbine to provide cooled bleed flow thereto for cooling thereof.

6. An engine according to claim 5 wherein said last stage blade airfoils have different aerodynamic profiles from root-to-tip to effect said main and bleed flows.

7. An engine according to claim 6 wherein said bleed flow is effected adjacent to one of said airfoil roots and tips over a radial extent of about 10% to about 15% of said compressor exit, and said main flow is effected in a remaining radial extent thereof.

8. An airfoil according to claim 7 wherein said above average pressure is up to about 6%.

9. An engine according to claim 7 wherein said bleed flow is effected adjacent to said airfoil tips, and said airfoils each further includes a mid-span section having a camber less than camber of said airfoil tip and root thereof.

10. An engine according to claim 7 further comprising a fan disposed upstream from said compressor and having a bypass duct extending downstream therefrom, and wherein said heat exchanger is an air-to-air heat exchanger disposed in said bypass duct for receiving fan bypass air to cool said bleed flow.

* * * * *